US010277966B2

(12) United States Patent
Xie et al.

(10) Patent No.: US 10,277,966 B2
(45) Date of Patent: Apr. 30, 2019

(54) BUS FC-AE-1553 NETWORK SYSTEM AND A METHOD OF DATA TRANSMISSION AND ACQUISITION

(71) Applicant: Beijing Tasson Science & Technology Co. Ltd, Beijing (CN)

(72) Inventors: Jingzhou Xie, Beijing (CN); Changming Xian, Beijing (CN); Peng Xie, Beijing (CN); Jianglong Wei, Beijing (CN)

(73) Assignee: BEIJING TASSON SCIENCE & TECHNOLOGY CO. LTD. (CN)

( * ) Notice: Subject to any disclaimer, the term of this patent is extended or adjusted under 35 U.S.C. 154(b) by 0 days.

(21) Appl. No.: 15/873,418

(22) Filed: Jan. 17, 2018

(65) Prior Publication Data

US 2018/0213306 A1 Jul. 26, 2018

(30) Foreign Application Priority Data

Jan. 24, 2017 (CN) .......................... 2017 1 0060379

(51) Int. Cl.
*H04Q 11/00* (2006.01)
*H04L 12/40* (2006.01)
*H04B 10/278* (2013.01)
*H04B 10/2581* (2013.01)

(52) U.S. Cl.
CPC ... *H04Q 11/0067* (2013.01); *H04L 12/40013* (2013.01); *H04Q 11/0066* (2013.01); *H04B 10/2581* (2013.01); *H04B 10/278* (2013.01); *H04Q 2011/0075* (2013.01); *H04Q 2011/0088* (2013.01)

(58) Field of Classification Search
CPC ........... H04Q 11/0067; H04Q 11/0066; H04Q 2011/0088; H04Q 2011/0075; H04L 12/40013; H04B 10/2581; H04B 10/278
USPC .......................................................... 398/66
See application file for complete search history.

(56) References Cited

PUBLICATIONS

Che, "A novel passive star network topology used in FC-AE-1553 protocol" 2014 IEEE International Conference on communication Problem-solving Publication Year: 2014, pp. 607-610.*
Guo, "A novel passive tree topology used in avionics network" 2016 2nd IEEE International Conference on Computer and Communications (ICCC) Publication Year: 2016 pp. 2358-2361.*

(Continued)

*Primary Examiner* — Juan A Torres
(74) *Attorney, Agent, or Firm* — Calfee Halter & Griswold LLP (57) ABSTRACT

The present application relates to a bus FC-AE-1553 network system and a method of data transmission and acquisition. The bus FC-AE-1553 network system includes a network controller, at least one network terminal, a bus optical distribution network, an optical splitter and a network matching device. The network controller optical distribution networks used for managing a communication process of the whole bus FC-AE-1553 network system; the network terminal optical distribution networks used for passively receiving an instruction of the network controller in the FC-AE-1553 network system, and completing an operation for the instruction of the network controller; the optical splitter is used for realizing branching of a fibre channel signal; and the network matching device is used for terminal matching of the bus optical distribution network, and realizing sequence forwarding.

14 Claims, 3 Drawing Sheets

(56) References Cited

PUBLICATIONS

Zhan, "Static +dynamic bandwidth allocation for PON FC-AE-1553 network," 2016 15th International Conference on Optical Communications and Networks (ICOCN) Publication Year: 2016 pp. 1-3.*

* cited by examiner

BUS FC-AE-1553 NETWORK SYSTEM AND A METHOD OF DATA TRANSMISSION AND ACQUISITION

CROSS-REFERENCE TO RELATED APPLICATIONS

This application claims priority to Chinese Patent Application No. 201710060379.9, filed on Jan. 24, 2017, which is hereby incorporated by reference in its entirety.

TECHNICAL FIELD

The present application relates to the technical field of topological structures of a bus FC-AE-1553 network system, and more particularly relates to a bus FC-AE-1553 network system and a data transmission and acquisition method.

BACKGROUND ART

The FC-AE-1553 bus is a burgeoning and highly reliable high-speed fibre channel bus, and a protocol thereof is formulated by American National Standards Institute (ANSI), FC-AE is referred to Fibre Channel Avionics Environment. The FC-AE-1553 bus defines the mapping from MIL-STD-1553B protocol to Fibre Channel (FC) high layer protocol, and provides protocol support for development of a fibre channel 1553 bus controller. Like a traditional MIL-STD-1553B bus, FC-AE-1553 defines a command/response bus standard, and is greatly improved in aspects of bus capacity, transmission rate, reliability and the like. Meanwhile, the FC-AE-1553 bus adopts a fibre channel transmission medium and a network topology structure, is strong in anti jamming capability and expansion capability, and is very suitable for electronic system networking and multi-terminal communication of a complicated spacecraft. Moreover, one extremely important characteristic of FC-AE-1553 is to support the access of the existing traditional MIL-STD-1553B bus into a fibre channel 1553 network in a bridging mode, thus existing MIL-STD-1553B equipment can be further preserved, resources can be saved, and smooth upgrade of the traditional 1553B bus can be realized. Therefore, FC-AE-1553 is the development direction of high-speed and high-reliability data buses in the aerospace field.

Currently, the bus FC-AE-1553 network based on a passive optical distribution network is suitable for being applied to occasions with fewer nodes, bus bandwidth of 10 Gbps or lower, and harsh power consumption requirements. In such a network, the access position of the FC-AE-1553 network bus controller has to be located at the foremost end of a bus, thus various nodes of the FC-AE-1553 network are limited at the space layout aspect.

SUMMARY OF THE INVENTION

In view of the above analysis, the present application aims to provide a bus FC-AE-1553 network system and a data transmission and acquisition method based on the FC-AE-1553 network system, so as to solve a problem that the access position of an existing network bus controller must be located at the foremost end of the bus.

The object of the present application is realized mainly by the following technical solutions:

A bus FC-AE-1553 network system includes: a network controller, at least one network terminal, a bus optical distribution network, an optical splitter and a network matching device.

The bus optical distribution network is connected with various nodes in an FC-AE-1553 network, and interface types include a network ordinary node and a network matching node;

the network controller is connected to the network ordinary node of the bus optical distribution network, and is used for managing a communication process of the whole bus FC-AE-1553 network system;

the network terminal is connected to the network ordinary node of the bus optical distribution network, and is used for passively receiving an instruction of the network controller in the FC-AE-1553 network system, and completing an operation for the instruction of the network controller;

the optical splitter is used for realizing branching of a fibre channel signal; and the network matching device has a connection position located at the foremost end of the bus FC-AE-1553 network system, and is used for terminal matching of the bus optical distribution network, and realizing sequence forwarding.

Preferably, the bus FC-AE-1553 network system adopts a two-way optical fiber bus design.

The present application also provides a data transmission method based on the bus FC-AE-1553 network system, including the following steps:

step S1, establishing communication between a network matching device and a network controller, and after the communication is established, transmitting a command sequence to the network matching device from the network controller;

step S2, after the command sequence is received by the network matching device, forwarding the command sequence from the network matching device to a network terminal;

step S3, establishing communication between the network matching device and the network controller again, and after the communication is established, transmitting a data sequence to the network matching device from the network controller;

step S4, after the data sequence is received by the network matching device, forwarding the data sequence from the network matching device to the network terminal;

step S5, establishing communication between the network matching device and the network terminal which receives data, and after the communication is established, transmitting a state sequence to the network matching device from the network terminal;

step S6, after the state sequence is received by the network matching device, forwarding the state sequence from the network matching device to the network controller; and step S7, after the state sequence is received and processed by the network controller, ending a current data transmission process by the network controller.

Therein, establishing communication means that the network controller or the network terminal adopts a fibre channel signal with wave length of $\lambda 1$ to transmit a lead code to the network matching device by an uplink, and waits until the receiving state of the uplink is stable.

A process of transmitting the command sequence or the data sequence or the state sequence to the network matching device from the network controller or the network terminal is that a fibre channel signal with wave length of $\lambda 1$ is adopted on an uplink to transmit the command sequence or the data sequence or the state sequence to the network matching device, wherein an address of a transmission destination is contained in the above-mentioned sequence; and a process of transmitting the command sequence or the data sequence or the state sequence to the network controller or the network terminal from the network matching device is that on a downlink, a fibre channel signal with wave length of λ2 is adopted to transmit the command sequence or the data sequence or the state sequence to the network controller or the network terminal, wherein the address of the transmission destination is contained in the above-mentioned sequence.

Preferably, the network matching device receives a sequence in a burst reception mode, and forwards the sequence in a broadcasting way.

The present application also provides a data acquisition method based on the bus FC-AE-1553 network system, including the following steps:

step S1, establishing communication between a network matching device and a network controller, and after the communication is established, transmitting a command sequence to the network matching device from the network controller;

step S2, after the command sequence is received by the network matching device, forwarding the command sequence from the network matching device to a network terminal;

step S3, after the command sequence is received by the network terminal, establishing communication between the network matching device and the network terminal, and then transmitting a state sequence to the network matching device from the network terminal;

step S4, after the state sequence is received by the network matching device, forwarding the state sequence from the network matching device to the network controller;

step S5, establishing communication between the network matching device and the network terminal again, and after the communication is established, transmitting a data sequence to the network matching device from the network terminal;

step S6, after the data sequence is received by the network matching device, forwarding the data sequence from the network matching device to the network controller; and step S7, after the data sequence is received and processed by the network controller, ending a current data acquisition process by the network controller.

Therein, establishing communication means that the network controller or the network terminal adopts a fibre channel signal with wave length of λ1 to transmit a lead code to the network matching device by an uplink, and waits until the receiving state of the uplink is stable.

A process of transmitting the command sequence or the data sequence or the state sequence to the network matching device from the network controller or the network terminal is that on an uplink, a fibre channel signal with wave length of λ1 is adopted to transmit to the network matching device, wherein an address of a transmission destination is contained in the above-mentioned sequence; and a process of transmitting the command sequence or the data sequence or the state sequence to the network controller or the network terminal from the network matching device is that on a downlink, a fibre channel signal with wave length of λ2 is adopted to transmit to the network controller or the network terminal, wherein the address of the transmission destination is contained in the above-mentioned sequence.

Preferably, the network matching device receives a sequence in a burst reception mode, and forwards the sequence in a broadcasting way.

The present application has the beneficial effects as follows: by arranging the network matching terminal, data exchange between the network controller and the network terminal is performed by the network matching terminal in data transmission and acquisition processes, and the problem that the connection position of a network bus controller must be located at the foremost end of a bus can be solved, so that the network controller can be connected to any node in a bus network, facilitating optical fiber wiring design of a system.

Other features and advantages of the present application will be explained in the following description, and part of them become obvious in the description, or are known by implementing the present application. The object and other advantages of the present application can be realized and achieved by the written description and Claims and specially indicated structures in the drawings.

BRIEF DESCRIPTION OF THE DRAWINGS

Drawings are merely used to illustrate objects of specific embodiments, and are not considered to limit the present application. In the whole drawings, the same reference symbols represent the same parts.

DETAILED DESCRIPTION OF THE INVENTION

Preferred embodiments of the present application will be specifically described below in conjunction with the drawings. As a part of the present application, the drawings are used to interpret principles of the present application together with embodiments of the present application.

The present application discloses a bus FC-AE-1553 network system and a data transmission and acquisition method based on the bus FC-AE-1553 network system.

Figure 1:
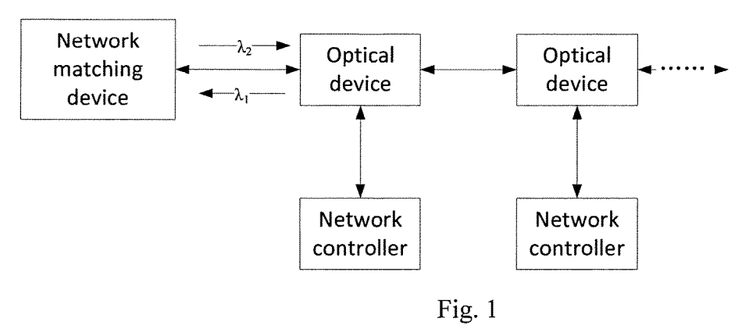
FIG. 1 is an interconnection relationship graph of a bus FC-AE-1533 network system.

The bus FC-AE-1553 network system (as shown in FIG. 1) includes a FC-AE-1553 protocol network controller (NC), at least one FC-AE-1553 protocol network terminal (NT), a bus optical distribution network (ODN), an optical splitter and a network matching device of a bus network.

The network controller (NC) is used for managing a communication process of the bus FC-AE-1553 network system, the network controller is connected to network ordinary node of the bus optical distribution network, and only the network controller can initiate communication between different nodes. There may only be one network controller in each FC-AE-1553 network system.

The network terminal (NT) is used for passively receiving an instruction from the network controller in the FC-AE-1553 network system, and completing an operation corresponding to the instruction from the network controller. The network terminal is connected to the network ordinary node of the bus optical distribution network. More network terminals can be arranged in each FC-AE-1553 network system as required.

The bus optical distribution network (ODN) is connected with various nodes in an FC-AE-1553 network through a network ordinary node or a network matching node. The optical power distribution of each network ordinary node should meet the requirement of photovoltaic conversion modules of various network nodes. The bus optical distribution network contains one network matching node and more network ordinary nodes.

The optical splitter can branch a fibre channel signal. The optical splitter is used to input the fibre channel signal to more outlets from an inlet according to a set proportion, or to input the optical fiber signal at an outlet to the optical fiber signal inlet. In data exchange between the network controller and the network terminal, branching of the fibre channel signal is performed by the optical splitter.

The network matching device is connected to the bus optical distribution network at the foremost end of a bus. The network matching device is used for terminal matching of the bus optical distribution network and realizing sequence forwarding. There is only one network matching device in each FC-AE-1553 network system, and the network matching device is connected to the network matching node of the bus optical distribution network.

The network controller (NC) and the network terminal (NT) in the bus FC-AE-1553 network system can be accessed through any network ordinary node in the bus optical distribution network (ODN), a fibre channel signal transmitted by the network controller (NC) and the network terminal (NT) has wave length of $\lambda 1$, occupies an uplink, and is in a burst mode; and a received fibre channel signal has wave length of $\lambda 2$, occupies a downlink, and is in a continuous mode. The network matching device is accessed to the bus optical distribution network by the network matching node, a received fibre channel signal has wave length of $\lambda 1$ and is in a burst mode, and a transmitted fibre channel signal has wave length of $\lambda 2$ and is in a continuous mode.

A communication process between various nodes in the bus FC-AE-1553 network system takes exchange of sequence as a basic unit; each exchange can include a single sequence or more sequences; the sequence may be a command sequence, a data sequence or a state sequence. Thus each exchange of sequence can be the exchange of a command sequence, a data sequence and/or a state sequence. The sequence transmitted is determined by a communication task to be performed.

Figure 2:
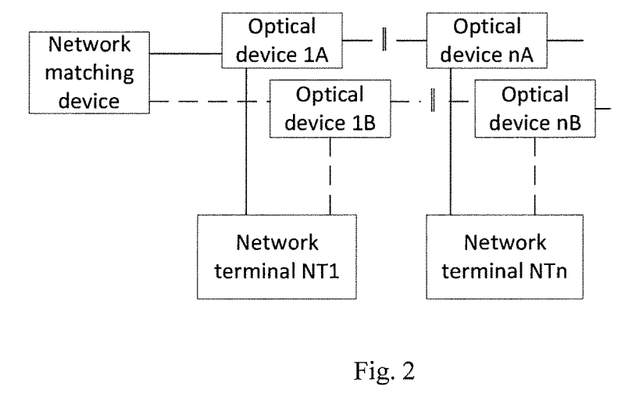
FIG. 2 is a two-way hot backup design diagram of a bus FC-AE-1533 network system.

Preferably, (as shown in FIG. 2), the bus FC-AE-1553 network system adopting hot backup of a two-way optical fiber bus includes at least one optical splitter A and at least one optical splitter B, wherein the number of the optical splitter(s) B is same as that of the optical splitter(s) A. During data exchange between the network controller and the network terminal, branching of a fibre channel signal is performed by the optical splitter A or the optical splitter B separately. N network controllers, N network terminals and N optical splitters A are included in a bus FC-AE-1553 network A; and N network controllers, N network terminals and N optical splitters B are included in another bus FC-AE-1553 network B. In case that the bus FC-AE-1553 network A is defaulted, when network terminal equipment is timed out without response, the bus FC-AE-1553 network A is automatically switched to the bus FC-AE-1553 network B for message retry; and in a similar way, in case that the bus FC-AE-1553 network B is defaulted, when network terminal equipment is timed out without response, the bus FC-AE-1553 network B is automatically switched to the bus FC-AE-1553 network A for message retry. In this way, when one of the bus FC-AE-1553 networks A and B cannot be used, the other bus FC-AE-1553 network can be used for communication, so that the bus FC-AE-1553 network has functions of automatic switching and automatic retry for message timeout, further realizing the object of achieving data transmission as long as any path of data are correct.

Figure 3:
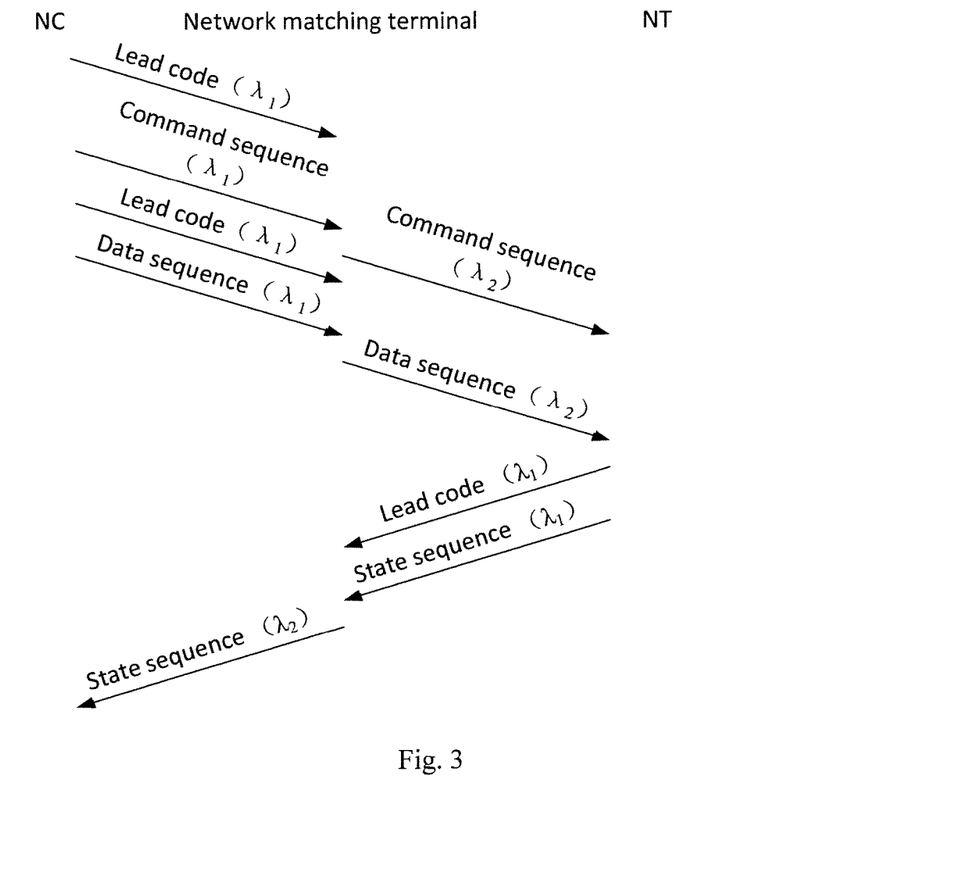
FIG. 3 is a schematic diagram of a method for transmitting data to a network terminal (NT) by a network controller (NC)

According to one embodiment of the present application, a method for transmitting data to a network terminal by a network controller in the FC-AE-1553 network is disclosed, as shown in FIG. 3, and including the following steps:

Step S1, a network controller transmits a fibre channel signal to establish communication with a network matching device; and after communication is established, the network controller transmits a command sequence to the network matching device by a fibre channel signal.

Specifically, the network controller adopts a fibre channel signal with wave length of $\lambda 1$ to transmit a lead code to the network matching device by an uplink, and waits until the receiving state of the uplink is stable, i.e., communication with the network matching device is established. Afterwards, the network controller adopts a fibre channel signal with wave length of $\lambda 1$ to transmit the command sequence to the network matching device by an uplink, wherein a network terminal address instructed by a command is contained in the command sequence, and the address is used for indicating one or more network terminals for realizing the command sequence.

Preferably, the network matching device receives the command sequence in a burst reception mode.

Step S2, after the network matching device receives the command sequence, the command sequence is forwarded to a network terminal.

Specifically, after the network matching device receives the command sequence, a fibre channel signal with wave length of $\lambda 2$ is adopted on a downlink to forward the command sequence to the network terminal.

Therein, the network terminal address instructed by the command is contained in the command sequence, so even various network terminals connected in the bus FC-AE-1553 network system all can receive the command sequence forwarded by the network matching device, only the network terminal matched with the network terminal address contained in the current command sequence receives and performs the command sequence.

Preferably, the network matching device forwards the command sequence to the network terminal in a broadcasting way.

Step S3, the network controller transmits a fibre channel signal to establish communication with the network matching device, and after communication is established, the network controller transmits a data sequence to the network matching device by a fibre channel signal.

Specifically, the network controller adopts a fibre channel signal with wave length of $\lambda 1$ to transmit a lead code to the network matching device by an uplink, and waits until the receiving state of the uplink is stable, i.e., communication with the network matching device is established. Afterwards, the network controller adopts a fibre channel signal with wave length of $\lambda 1$ to transmit a data sequence to the network matching device by an uplink, wherein a network terminal address is contained in the data sequence, and the address should be the same as the network terminal address contained in the command sequence, and indicates one network terminal for receiving the data sequence.

Preferably, the network matching device receives the data sequence in a burst reception mode.

Step S4, after the network matching device receives the data sequence, the data sequence is forwarded to the network terminal.

Specifically, after the network matching device receives the data sequence, a fibre channel signal with wave length of λ2 is adopted on a downlink to transmit the data sequence to the network terminal.

The network terminal address is contained in the data sequence, and therefore, even various network terminals connected in the bus FC-AE-1553 network system all can receive the data sequence forwarded by the network matching device, only the network terminal matched with the network terminal address contained in the current data sequence further receives and stores the data sequence.

Preferably, the network matching device forwards the data sequence to the network terminal in a broadcasting way.

Step S5, the network terminal receiving data transmits a fibre channel signal to establish communication with the network matching device, and after communication is established, the network terminal transmits a state sequence to the network matching device by a fibre channel signal.

Specifically, the network terminal matched with the network terminal address in the data sequence adopts a fibre channel signal with wave length of λ1 to transmit a lead code to the network matching device by an uplink, and waits until the receiving state of the uplink is stable, i.e., communication with the network matching device is established. Afterwards, the network controller adopts a fibre channel signal with wave length of λ1 to transmit a state sequence to the network matching device by an uplink, wherein the network controller address is contained in the state sequence.

Preferably, the network matching device receives the state sequence in a burst reception mode.

Step S6, after the network matching device receives the state sequence, the state sequence is forwarded to the network controller.

Specifically, after the network matching device receives the state sequence, a fibre channel signal with wave length of λ2 is adopted on a downlink to transmit the state sequence to the network controller. As the network controller address is contained in the state sequence, the network matching device transmits the state sequence to the network controller corresponding to the network controller address.

Preferably, the network matching device forwards the state sequence to the network controller in a broadcasting way.

Step S7, after the network controller receives and processes the state sequence, the network controller ends a current data transmission process, thus the process of transmitting data to the network terminal by the network controller is finished.

Figure 4:
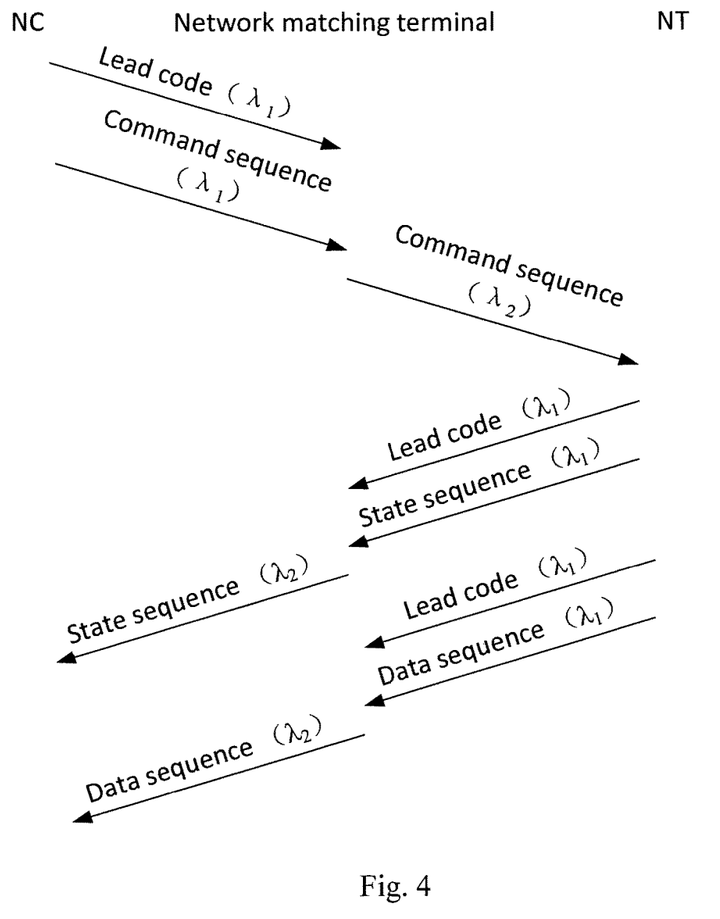
FIG. 4 is a schematic diagram of a method for acquiring data from a network terminal (NT) by a network controller (NC).

Another embodiment of the present application discloses a method for acquiring data from a network terminal by a network controller in the FC-AE-1553 network, as shown in FIG. 4, and including the following steps:

Step S1, a network controller transmits a fibre channel signal to establish communication with a network matching device; and after communication is established, the network controller transmits a command sequence to the network matching device by a fibre channel signal.

Specifically, the network controller adopts a fibre channel signal with wave length of λ1 to transmit a lead code to the network matching device by an uplink, and waits until the receiving state of the uplink is stable, i.e., communication with the network matching device is established. Afterwards, the network controller adopts a fibre channel signal with wave length of λ1 to transmit the command sequence to the network matching device by an uplink, wherein a network terminal address instructed by a command is contained in the command sequence, and the network terminal address is used for indicating one or more network terminals for realizing the command sequence.

Preferably, the network matching device receives the command sequence in a burst reception mode.

Step S2, after the network matching device receives the command sequence, the command sequence is forwarded to a network terminal.

Specifically, after the network matching device receives the command sequence, a fibre channel signal with wave length of λ2 is adopted on a downlink to forward the command sequence to the network terminal.

The network terminal address instructed by the command is contained in the command sequence, so even various network terminals connected in a bus FC-AE-1553 network system all can receive the command sequence forwarded by the network matching device, only the network terminal matched with the network terminal address contained in the current command sequence receives and performs the command sequence.

Preferably, the network matching device forwards the command sequence to the network terminal in a broadcasting way.

Step S3, the network terminal establishes communication with the network matching device after receiving the command sequence, and then the network terminal transmits a state sequence to the network matching device by a fibre channel signal.

Specifically, the network terminal adopts a fibre channel signal with wave length of λ1 to transmit a lead code to the network matching device by an uplink, and waits until the receiving state of the uplink is stable, i.e., communication with the network matching device is established. Afterwards, the network terminal adopts a fibre channel signal with wave length of λ1 to transmit a state sequence to the network matching device by an uplink, wherein a network controller address is contained in the data sequence.

Preferably, the network matching device receives the data sequence in a burst reception mode.

Step S4, after the network matching device receives the state sequence, the state sequence is forwarded to the network controller.

Specifically, after the network matching device receives the state sequence, a fibre channel signal with wave length of λ2 is adopted on a downlink to transmit the state sequence to the network controller.

The network controller address is contained in the state sequence, and therefore the network matching device transmits the state sequence to the network controller matched with the network controller address in the state sequence.

Preferably, the network matching device forwards the data sequence to the network controller in a broadcasting way.

Step S5, the network terminal transmits a fibre channel signal to establish communication with the network matching device again, and after communication is established, the network terminal transmits a data sequence to the network matching device by a fibre channel signal.

Specifically, the network terminal adopts a fibre channel signal with wave length of λ1 to transmit a lead code to the network matching device by an uplink, and waits until the receiving state of the uplink is stable, i.e., communication with the network matching device is established. Afterwards, the network terminal adopts a fibre channel signal with wave length of λ1 to transmit the data sequence to the network matching device by an uplink, wherein the network controller address is contained in the data sequence.

Preferably, the network matching device receives the data sequence in a burst reception mode.

Step S6, after the network matching device receives the data sequence, the data sequence is forwarded to the network controller.

Specifically, after the network matching device receives the data sequence, a fibre channel signal with wave length of λ2 is adopted on a downlink to transmit the state sequence to the network controller.

Therein, as the network controller address is contained in the data sequence, the network matching device transmits the data sequence to the network controller matched with the network controller address in the data sequence.

Preferably, the network matching device forwards the data sequence to the network controller in a broadcasting way.

Step S7, after the network controller receives and processes the data sequence, the network controller ends a current data acquisition process, thus the process of acquiring data of the network terminal by the network controller is finished.

To sum up, the embodiments of the present application provide a data transmission method and a data acquisition method in the bus FC-AE-1553 network system, and by arranging the network matching terminal to realize data exchange processes of command reception, state transmission, data transmission and acquisition, and the like between network terminals as well as between a network controller and one network terminal, the problem that the access position of a network bus controller must be located at the foremost end of a bus can be solved, so that the network controller can be connected to any node in a bus network. It is for facilitating optical fiber wiring designing of a system, further relieving the layout difficulty of FC-AE-1553 network equipment in a narrow space in a specific field, and realizing flexible switching of node positions of network control equipment and one network terminal.

Those skilled in the art can understand that the whole or part of procedures for realizing the methods of the aforementioned embodiments can be completed by instructing related hardware through computer programs, and the programs can be stored in a computer readable storage medium, wherein the computer readable storage medium is a disk, an optical disk, a read only memory, or a random access memory, or the like.

What is mentioned above only involves preferred specific embodiments of the present application, but the protection scope of the present application is not limited thereto. Any variation or replacement which can be easily conceived by those skilled in the art in the technical scope disclosed by the present application should fall within the protection scope of the present application.

What is claimed is:

1. A bus FC-AE-1553 network system, comprising: a network controller, a network terminal, a bus optical distribution network, an optical splitter and a network matching device, wherein
the bus optical distribution network is connected with various nodes in an FC-AE-1553 network via a network ordinary node or a network matching node;
the network controller is connected to the network ordinary node of the bus optical distribution network, and is used for managing a communication process of the whole bus FC-AE-1553 network system;
the network terminal is connected to the network ordinary node of the bus optical distribution network, and is used for passively receiving an instruction of the network controller in the FC-AE-1553 network system, and completing an operation for the instruction of the network controller;
the optical splitter is used for realizing branching of a fibre channel signal; and
the network matching device has a connection position located at the foremost end of the bus FC-AE-1553 network system, and is used for terminal matching of the bus optical distribution network, and realizing sequence forwarding.

2. The bus FC-AE-1553 network system of claim 1, wherein the bus FC-AE-1553 network system adopts a two-way optical fiber bus design.

3. A data transmission method based on the bus FC-AE-1553 network system of claim 1, comprising the following steps:
step S1, establishing communication between a network matching device and a network controller, and transmitting a command sequence from the network controller to the network matching device after the communication is established;
step S2, after the command sequence is received by the network matching device, forwarding the command sequence from the network matching device to a network terminal;
step S3, establishing communication between the network matching device and the network controller again, and transmitting a data sequence from the network controller to the network matching device after the communication is established;
step S4, after the data sequence is received by the network matching device, forwarding the data sequence from the network matching device to the network terminal;
step S5, establishing communication between the network matching device and the network terminal which receives data, and after the communication is established, transmitting a state sequence from the network terminal to the network matching device;
step S6, after the state sequence is received by the network matching device, forwarding the state sequence from the network matching device to the network controller; and
step S7, after the state sequence is received and processed by the network controller, ending a current data transmission process by the network controller.

4. A data acquisition method based on the bus FC-AE-1553 network system of claim 1, comprising the following steps:
step S1, establishing communication between a network matching device and a network controller, and after the communication is established, transmitting a command sequence from the network controller to the network matching device;
step S2, after the command sequence is received by the network matching device, forwarding the command sequence from the network matching device to a network terminal;
step S3, after the command sequence is received by the network terminal, establishing communication between the network matching device and the network terminal, and then transmitting a state sequence from the network terminal to the network matching device;
step S4, after the state sequence is received by the network matching device, forwarding the state sequence from the network matching device to the network controller;

step S5, establishing communication between the network matching device and the network terminal again, and transmitting a data sequence from the network terminal to the network matching device after communication is established;

step S6, after the data sequence is received by the network matching device, forwarding the data sequence from the network matching device to the network controller; and step S7, after the data sequence is received and processed by the network controller, ending a current data acquisition process by the network controller.

5. The data transmission method of claim 3, wherein establishing communication means that the network controller or the network terminal adopts a fibre channel signal with wave length of $\lambda_1$ to transmit a lead code to the network matching device by an uplink, and waits until a receiving state of the uplink is stable.

6. The data transmission method of claim 3, wherein a process of transmitting the command sequence or the data sequence or the state sequence to the network matching device from the network controller or the network terminal is that on an uplink, a fibre channel signal with wave length of $\lambda_1$ is adopted to transmit the command sequence or the data sequence or the state sequence to the network matching device, wherein an address of a transmission destination is contained in the above-mentioned sequence; and a process of transmitting the command sequence or the data sequence or the state sequence to the network controller or the network terminal from the network matching device is that on a downlink, a fibre channel signal with wave length of $\lambda_2$ is adopted to transmit the command sequence or the data sequence or the state sequence to the network controller or the network terminal, wherein the address of the transmission destination is contained in the above-mentioned sequence.

7. The data transmission method of one of claim 3, wherein the network matching device receives a sequence in a burst reception mode, and forwards the sequence in a broadcasting way.

8. The data acquisition method of claim 4, wherein establishing communication means that the network controller or the network terminal adopts a fibre channel signal with wave length of $\lambda_1$ to transmit a lead code to the network matching device by an uplink, and waits until the receiving state of the uplink is stable.

9. The data acquisition method of claim 4, wherein a process of transmitting the command sequence or the data sequence or the state sequence to the network matching device from the network controller or the network terminal is that on an uplink, a fibre channel signal with wave length of $\lambda_1$ is adopted to transmit to the network matching device, wherein an address of a transmission destination is contained in the above-mentioned sequence; and a process of transmitting the command sequence or the data sequence or the state sequence to the network controller or the network terminal from the network matching device is that on a downlink, a fibre channel signal with wave length of $\lambda_2$ is adopted to transmit to the network controller or the network terminal, wherein the address of the transmission destination is contained in the above-mentioned sequence.

10. The data acquisition method of one of claim 4, wherein the network matching device receives a sequence in a burst reception mode, and forwards the sequence in a broadcasting way.

11. The data transmission method of one of claim 4, wherein the network matching device receives a sequence in a burst reception mode, and forwards the sequence in a broadcasting way.

12. The data transmission method of one of claim 6, wherein the network matching device receives a sequence in a burst reception mode, and forwards the sequence in a broadcasting way.

13. The data acquisition method of one of claim 8, wherein the network matching device receives a sequence in a burst reception mode, and forwards the sequence in a broadcasting way.

14. The data acquisition method of one of claim 9, wherein the network matching device receives a sequence in a burst reception mode, and forwards the sequence in a broadcasting way.

* * * * *